(No Model.) 2 Sheets—Sheet 1.
A. BRUEGGER.
VEHICLE BRAKE.
No. 500,188. Patented June 27, 1893.
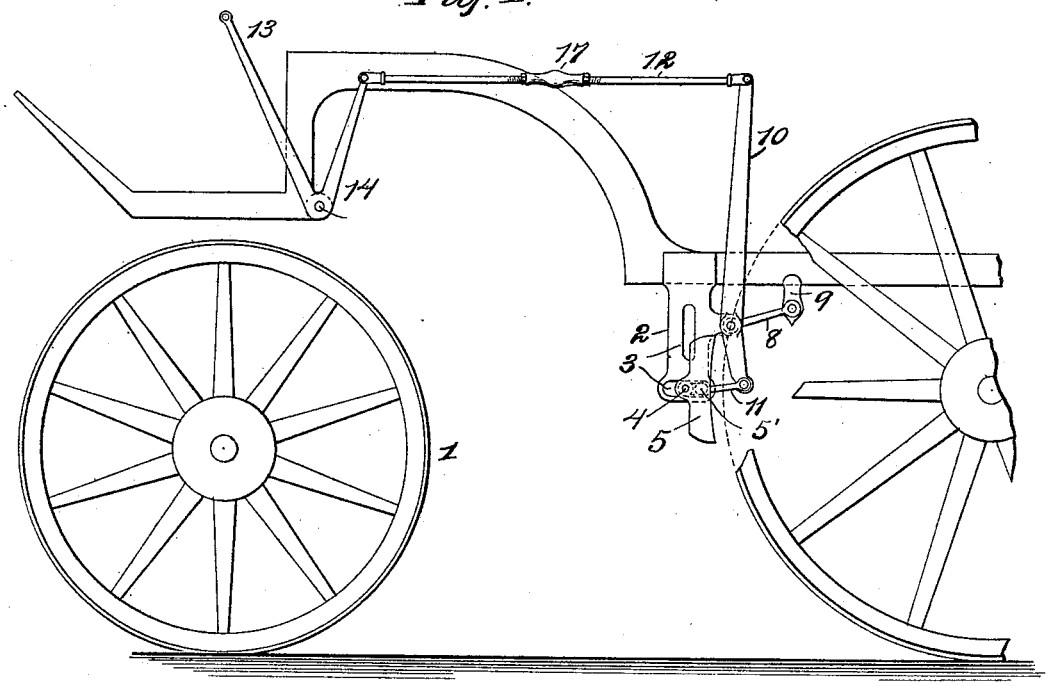
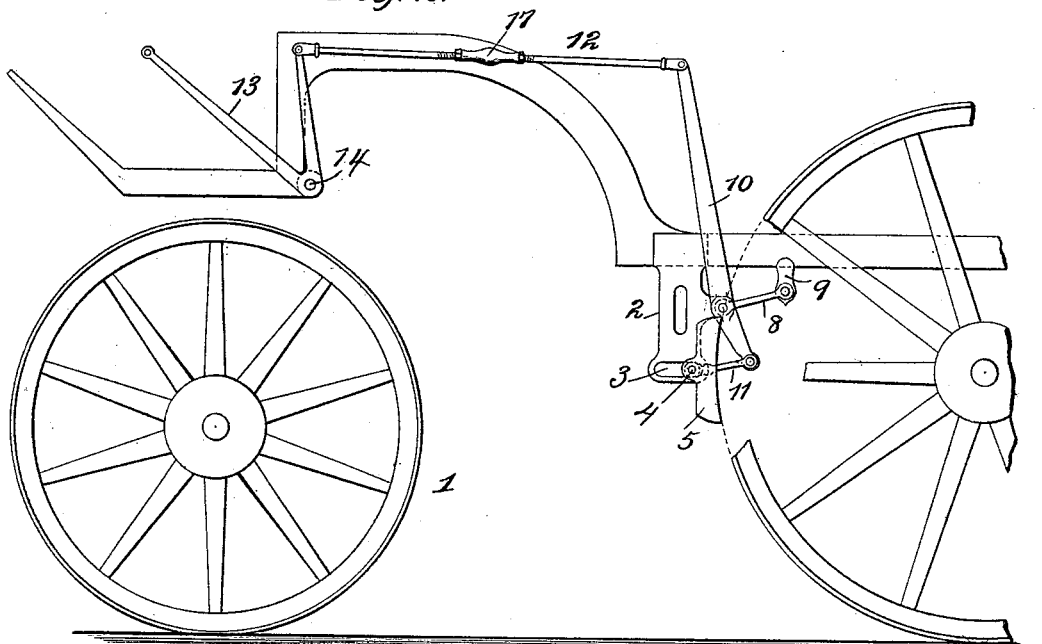

(No Model.) 2 Sheets—Sheet 2.
A. BRUEGGER.
VEHICLE BRAKE.
No. 500,188. Patented June 27, 1893.
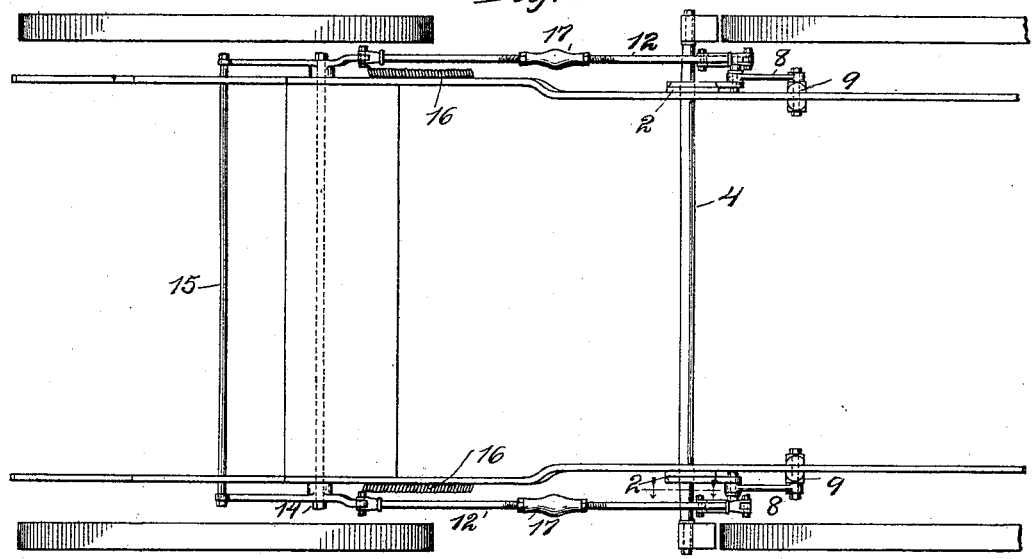
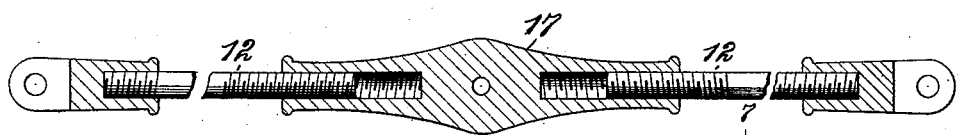
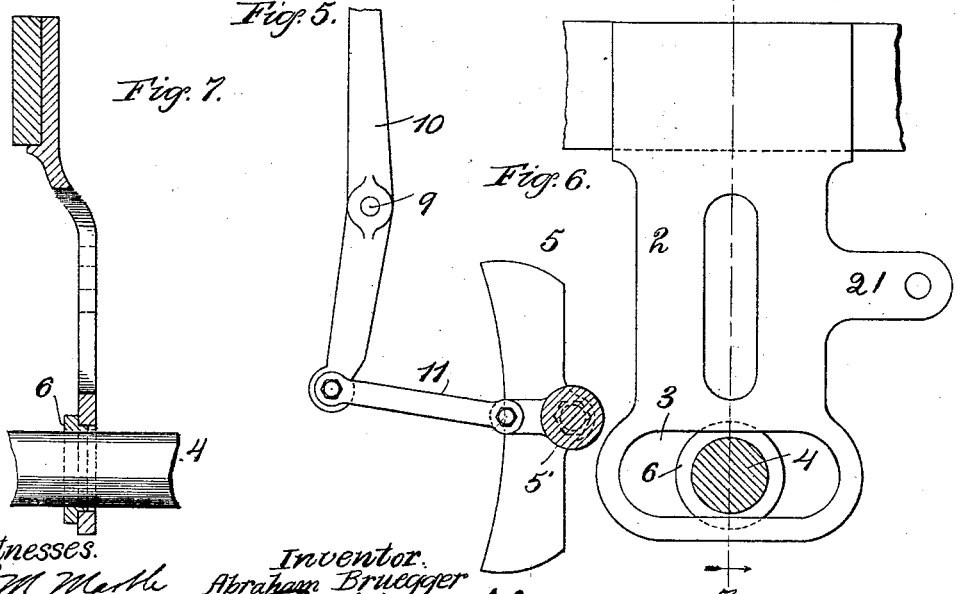
Witnesses.
Inventor.
Abraham Bruegger
By E. M. Marble
Attorney.

UNITED STATES PATENT OFFICE.

ABRAHAM BRUEGGER, OF MUSKEGON, MICHIGAN, ASSIGNOR TO THE MUSKEGON CHEMICAL FIRE ENGINE COMPANY, OF SAME PLACE.

VEHICLE-BRAKE.

SPECIFICATION forming part of Letters Patent No. 500,188, dated June 27, 1893.

Application filed October 29, 1892. Serial No. 450,383. (No model.)

*To all whom it may concern:*

Be it known that I, ABRAHAM BRUEGGER, a citizen of the United States, residing at Muskegon, in the county of Muskegon and State of Michigan, have invented certain new and useful Improvements in Brakes for Vehicles; and I do hereby declare the following to be a full, clear, and exact description of the invention, such as will enable others skilled in the art to which it appertains to make and use the same.

My invention relates to improvements in brakes for vehicles, and particularly to improvements in that class thereof which, by reason of their powerful and instantaneous action, are adapted for use on vehicles requiring great power, such as fire engines, and it consists in the construction and arrangement of parts which will be hereinafter more fully described, and particularly pointed out in the claims.

The object of my invention is to produce a brake in which pressure on a single rod will apply the brakes to both sides of the vehicle, will be certain and positive in its action, permit of the application of great power to the brake shoes, may be easily applied, is cheap to manufacture, readily put in place, and capable of close adjustment as to the position of its several parts, and which shall permit of the replacement of the parts of the brake subjected to the greatest wear without the necessity of replacing the whole brake.

My invention is fully illustrated in the accompanying drawings forming a part of this application, in which the same reference numerals indicate the same or corresponding parts, and in which—

Figure 1 is a side view of a wagon with my brake attached, the parts of the brake being shown in the position they assume when the brake is not applied. Fig. 2 is a similar view of the wagon, the brake being shown applied. Fig. 3 is a plan view of the wagon, showing particularly the foot bar extending across the front of the wagon, and springs for holding said bar in position when the brake is not applied, and the relative positions of the other parts. Fig. 4 is a sectional view of the adjustable coupling by means of which I adjust the relative positions of the various parts of my brake. Fig. 5 is a side view of the brake shoe, and the rods attached thereto. Fig. 6 is a front view of the hangers which support the shaft carrying the brake shoes. Fig. 7 is a section of one of said hangers on line 7 7, Fig. 6, showing particularly the location and formation of the collar on the shaft carrying the brake shoes, which slides in a slot formed in said hanger.

Referring to the drawings, 1 represents a wagon provided with my brake.

2 represents the hangers secured to and depending from the frame of the wagon on each side thereof, just in front of the wheels to which the brakes are to be applied, and formed with the transverse slot 3, through which the rod 4, extending across the body of the wagon, and bearing on its ends the brake shoes 5, extends.

In order that the rod 4 may not be exposed to wear at the points where it passes through the hangers 3, I place on said rod collars 6, a portion of the width of which is planed away on parallel lines, as shown in Figs. 6 and 7, to allow such portion to enter into the slot 3, and thus form a bearing for the rod 4, as it moves back and forward in said slot. The collar 6, secured from entering too far into the slot by the part not planed away, is prevented from sliding along the rod 4 away from the slot by any suitable means.

In the use of the brake, I prefer to so arrange the collars 6 that in each case the planed portions face outward, but such arrangement may be varied if desired.

The collars 6 serve to make the reciprocation of the shaft 4 steady and uniform, prevent any useless movement of the rod 4 in its reciprocation, and while taking all the wear which would otherwise fall upon the rod 4, can easily and cheaply be replaced. At its outer ends, the rod 4 passes through the back portion of the brake shoes at 5', which is rounded out to secure the necessary aperture.

The hanger 2 is held in place from any longitudinal movement by the rod 8, which is fastened at one end to the lug 9 depending from the frame of the wagon, and at its other end to a lug 2' formed on said hangers. At the junction of said rod and said hanger is formed the fulcrum for the rod 10, which carries on its lower end the link 11, connecting with the brake-shoe 5, and at its upper end with the adjustable coupling 12, which is attached to the bell-crank 13, pivoted to the frame of the wagon at 14, and thus to rod 15, to which power is directly applied.

I provide for the adjustment of the position of the rod 4 in the slot 3 formed in the hanger 2 when the brake is not applied by the use of the nut 17. The ends of this nut are hollow and screw-threaded, and since the ends of the rods fitting therein are also screw-threaded, it is evident that the length of the coupling 12 may be varied within certain limits, and thus the required adjustment provided for. The amount of movement of the rod 15 necessary to apply to the fullest extent the brakes is also thus determined. I also provide the springs 16, attached at one end to the coupling rods 12, at their connections with the bell-cranks 13, and at their other ends with the frame of the wagon, to keep the foot rod 15 raised, when the brake is not applied.

The operation of the brake is as follows: When rod 15 is pushed downward, the upper end of the rod 10 is moved forward, and the lower end of said rod is drawn backward, thus applying the brake shoe to the wheel. The amount of downward movement of rod 15 to fully apply the brake can, as before stated, be varied at will by means of the coupling nut 17. The position of foot rod 15 enables the downward pressure to be made very strong without requiring undue attention of the driver, and at the same time helps to equalize the pressure on the brakes on the sides of the wagon.

Having thus fully described my invention, its construction and operation, what I claim as new, and desire to secure by Letters Patent, is—

1. In a brake attachment for vehicles, the combination with the frame thereof, of supporting hangers provided with transverse slots, reciprocating brake shoes, the rod connecting said shoes sliding in said transverse slots, pivoted levers having a link connection with the shoes, and means by which the driver may operate said levers and shoes, substantially as described.

2. In a brake attachment for vehicles, the combination with the frame thereof, of supporting hangers provided with transverse slots and sustaining lugs, reciprocating brake shoes, the rod connecting said shoes sliding in said transverse slots pivoted levers bent slightly rearward below their pivot and having a link connection with the shoes, and means by which the driver may operate said levers and shoes, substantially as described.

3. In a brake attachment for vehicles, the combination with the frame thereof, of transverse hangers provided with transverse slots and sustaining lugs, reciprocating brake shoes, the rod connecting said shoes sliding in said transverse slots and being provided with adjustable collars to form the bearings for its reciprocation in said slots, pivoted levers bent slightly rearward below their pivot and having a link connection with the shoes, and means by which the driver may operate said levers and shoes, substantially as described.

In testimony whereof I affix my signature in presence of two witnesses.

ABRAHAM BRUEGGER.

Witnesses:
WILLIAM A. GLEW,
N. J. BROWN.